United States Patent

[11] 3,627,419

| [72] | Inventor | Victor Carlomon Thevenier<br>Jemappes, Belgium |
|---|---|---|
| [21] | Appl. No. | 737,193 |
| [22] | Filed | June 14, 1968 |
| [45] | Patented | Dec. 14, 1971 |
| [73] | Assignee | Societe-Intercommunale Belge de Gaz et<br>d'Electricite, en abreg Intercom<br>Brussels, Belgium |
| [32] | Priority | June 19, 1967 |
| [33] | | Belgium |
| [31] | | 700,158 |

[54] METHOD OF DETECTION, DOSAGE AND THE LIKE, OF A HYDROCARBON IN A FLUID AND APPARATUS FOR WORKING SUCH METHOD
6 Claims, 3 Drawing Figs.

[52] U.S. Cl. .................................................. 356/36,
73/61.1, 250/218, 356/70, 356/72, 356/180,
356/186, 356/208
[51] Int. Cl. ...................................................... G01n 1/00,
G01n 21/00, G01j 3/46
[50] Field of Search ........................................... 356/36, 70,
72, 102–104, 179–181, 184, 186, 188, 195, 196,
207, 208; 250/218; 73/61.1

[56] References Cited
UNITED STATES PATENTS

| 2,519,081 | 8/1950 | Skarstrom .................. | 250/218 |
| 2,662,752 | 12/1953 | Miller et al. ................. | 356/208 X |
| 2,968,940 | 1/1961 | Feldman et al. .............. | 356/70 X |
| 3,271,998 | 9/1966 | Topol ............................ | 73/61.1 |
| 3,233,448 | 2/1966 | Brown .......................... | 73/61.1 |

FOREIGN PATENTS

| 1,091,974 | 11/1967 | Great Britain ................ | 356/208 |

*Primary Examiner*—Ronald L. Wibert
*Assistant Examiner*—Warren A. Sklar
*Attorney*—Cushman, Darby & Cushman ABSTRACT: A method for detecting a hydrocarbon in a carrier liquid wherein a sample of the carrier liquid is diffused in a solvent for the hydrocarbon, and changes in the color of the solvent due to amounts of hydrocarbon dissolved therein are optically measured as an indication of the hydrocarbon on the carrier liquid.

INVENTOR
VICTOR CARLOMON THEVENIER
BY Cushman, Darby & Cushman
ATTORNEYS

METHOD OF DETECTION, DOSAGE AND THE LIKE, OF A HYDROCARBON IN A FLUID AND APPARATUS FOR WORKING SUCH METHOD

The present invention has for its object a method of detection, dosage, and the like, of a hydrocarbon in a fluid, in particular in water.

The invention aims at furnishing a method enabling to detect in an easy and reliable manner the presence of a hydrocarbon in a fluid and that even if the concentration of hydrocarbon in such fluid is of 50 p.p.b. magnitude.

For that purpose, according to the invention, the said method comprises diffusing a sample of water in a portion of a zone comprising a mass of solvent not miscible with water and having a specific gravity different from that of water, in order to procure in that portion of the zone, an emulsion of water and solvent, the separation of water and solvent being effected by gravity, the operations of checking, measuring, sampling of solvent, and the like, being carried out in the other portion of the solvent zone, the latter not being disturbed by the diffusion of the sample of water.

According to the invention, the sampling water is diffused continuously amongst the solvent, such water being carried away, after separation of the solvent, also continuously.

According to the invention, the solvent in the portion of the nondisturbed zone of solvent is recycled in the portion of the mass of solvent wherein the diffusion of the sampling water takes place.

The invention has also for its object an apparatus for working the said method, such apparatus, of very simple and inexpensive construction being easily handled and taking up little space and enabling a very fast detection of the presence of a hydrocarbon in a fluid and that however low may be the concentration of the hydrocarbon in such fluid.

For that purpose, according to the invention, the said apparatus comprises a column containing the said zone of solvent, means being provided to diffuse a sample of water in a portion of the zone of solvent in order to procure an emulsion, in such portion of the zone, without disturbing the solvent in the other portion of the zone, the portion of the zone wherein the emulsion is formed being either the upper zone of the column, or the lower zone, depending on whether the specific gravity of the solvent is higher or lower than the specific gravity of water, means being provided to carry the water, after separation thereof from the solvent, away from the column, such separation being effected by gravity.

According to a form of embodiment of the invention, the sampling water is diffused continuously in the said portion of zone of solvent, the extraction of the water from the column, after separation by gravity of the water and the solvent, being carried out either by slopeover or overflow in case the specific gravity of the solvent exceeds that of water, or by means of a conduit provided at the bottom of the column and the flow thereof is equal to the flow of the sampling water delivery pipe in case the specific gravity of the solvent is less than that of water.

According to an advantageous form of embodiment of the invention, the apparatus comprises a device for recycling the solvent from the portion of the nondisturbed zone of solvent to the portion of the zone of solvent wherein the said emulsion is formed.

According to a particularly advantageous form of embodiment of the invention, measuring instruments are branched off the conduit for recycling the solvent from the portion of the nondisturbed zone of solvent to the portion of the zone of solvent wherein the emulsion is formed, such device comprising a conduit opening into the said two portions of zone, the circulation of the solvent being carried out by means of a pump, such conduit passing for example, for the measuring operations, through a photocolorimeter.

Other details and features of the invention will become apparent from the description of the drawings accompanying the present specification and which illustrate the said method and show, by way of nonlimitative examples, two particular forms of embodiment of the apparatus according to the invention.

In the different FIGS., the same reference numerals refer to similar elements.

Figure 1:
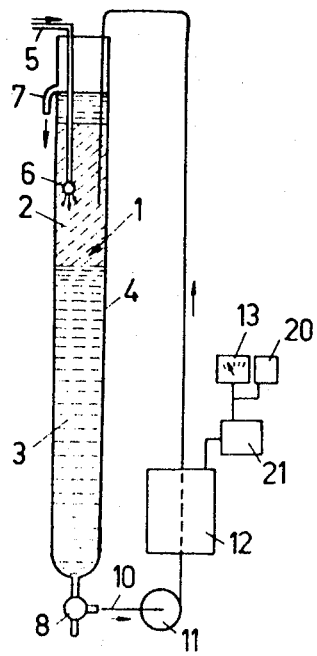
FIG. 1 shows a diagrammatic, elevational view of an apparatus for working the said method.
Figure 2:
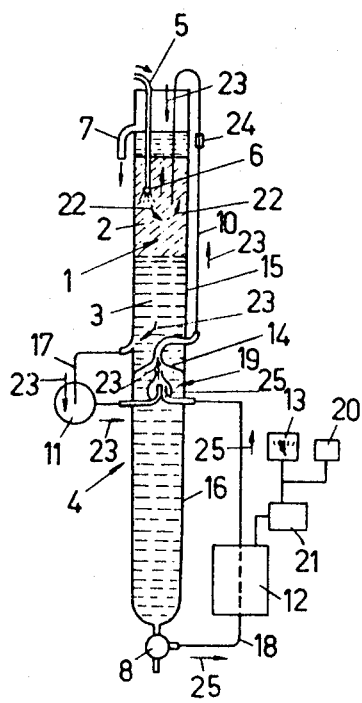
FIG. 2 shows a diagrammatic, elevational view of a modification of the apparatus shown in FIG. 1
Figure 3:
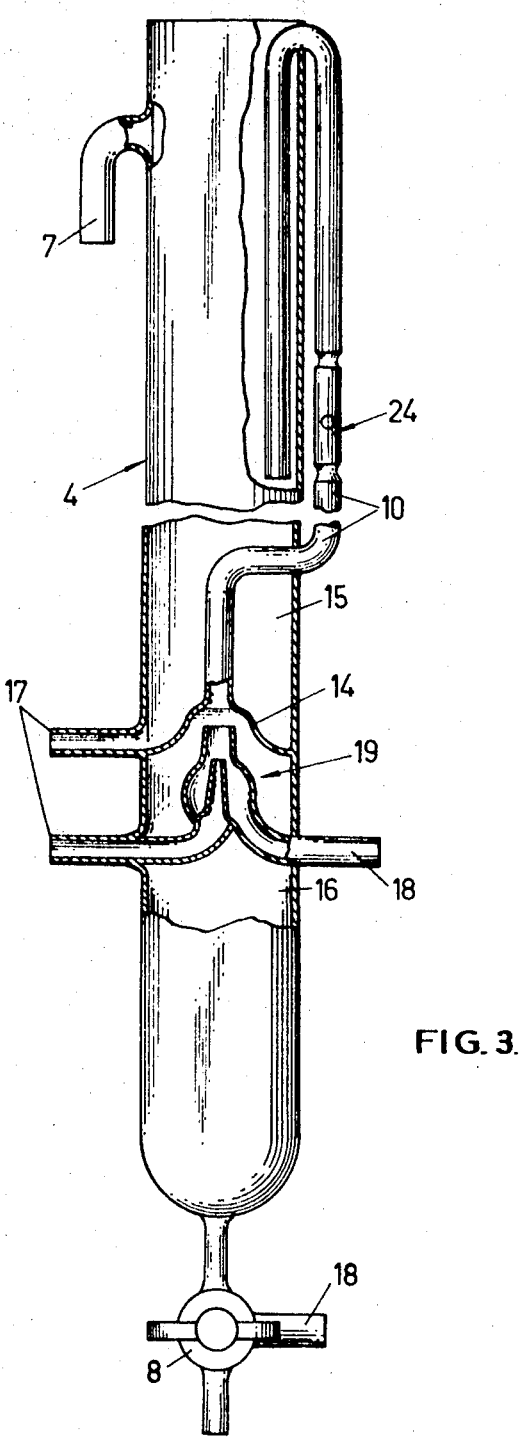
FIG. 3 shows a detail elevational view partially broken away of the column of the apparatus shown in FIG. 2.

The method according to the invention, illustrated in the FIGS. 1 and 2, comprises, in order to detect, dose and the like, a hydrocarbon in a fluid, for example fuel oil in condensates to be used for feeding steam boilers, in waste waters and the like, the diffusion of a sample of water in a portion 2 of a zone 1 comprising a determined mass of solvent such as carbon tetrachloride, not miscible with water and having a specific gravity exceeding that of water, in order to procure in such portion 2 of the zone an emulsion of water and solvent, the separation of water and solvent being carried out by gravity, the operations of checking, measuring, sampling of solvent and the like being carried out in the portion 3 of the zone 1 of solvent, the latter not being disturbed by the diffusion of the sample of water. The sampling water is continuously diffused amongst the portion 2 of the solvent zone and is carried away, after separation of the solvent also continuously. In order to permit the definite detection of minute quantities of hydrocarbon contained in the sampling water, the solvent of the portion 3 of the zone 1 of solvent is recycled in the portion 2 of the mass of solvent wherein the diffusion of the sampling water is carried out.

This procedure offers the advantage, by diffusing a sampling of water continuously in the solvent, of enabling the detection, by cumulative effect and merely on sight of the solvent, the least traces of hydrocarbon in the water analyzed. Carbon tetrachloride is used with advantage as a solvent as it does not pollute the sampling water, its high specific gravity insures a perfect separation of the solvent-sampling water emulsion, it turns yellow after dissolving a hydrocarbon, the intensity of such coloration being directly related to the quantity of dissolved hydrocarbon.

According to the invention the apparatus for working the said method shown in FIG. 1 is designed to use a solvent, such as carbon tetrachloride, of a specific gravity exceeding that of water and comprises a reaction column 4 in a transparent material, such as glass, containing the said zone 1 of solvent. The sampling water is delivered to the column 4 by a pipe 5 and is diffused in the portion 2 of the zone 1 of solvent with the help of a diffusion rose 6 in order to provide an emulsion in that portion 2 of solvent without disturbing the solvent in the portion 3 of the zone 1. The column 4 is provided with a pipe 7 to carry away by spill over, the sampling water after the separation thereof by gravity from the solvent. A valve 8 is provided on the column in order, on the one hand, to drain off the solvent and, on the other hand, to connect the column 4 and a pipe 10 by means of which, and of a pump 11, the solvent is recycled from the portion 3 of the zone of solvent to the portion 2 of the latter.

The said apparatus may be used in different manners. Indeed, after admission of the sample of water in the apparatus, the presence of hydrocarbon and the quantity of hydrocarbon present in such sample may be noted and evaluated, even if the proportion of hydrocarbon in water is minute and by means of the cumulative effect of the system by examining the coloration of the solvent directly in the portion 3 of the zone 1 of solvent contained in the column. By means of the valve 8, it is also possible to take a sample of solvent from the said portion 3 and to carry out measurements with a photocolorimeter. Such photocolorimeter 12 may also be mounted on the conduit 10 and be connected to an indicator 13 on which may be read the hydrocarbon content for the sampling water, a sound alarm device 20 may also be connected to the photocolorimeter in order to set off a signal when the proportion of hydrocarbon in solution in the solvent of the apparatus reaches a preset value. The apparatus might also be used so as to permit the automatic continuous dosage of the hydrocarbons present in the water, the apparatus being then provided with a system enabling the automatic draining at regular intervals of the solvent contained in column and the replacement thereof by fresh solvent.

The apparatus according to the invention shown in FIG. 2 is designed, like the apparatus hereinbefore described, for use with a solvent, such as carbon tetrachloride, of a specific gravity exceeding that of water. This apparatus comprises a reaction column 4 divided by a partition 14 into two columns one on top of the other these columns termed hereinafter as the extraction column 15 and the measuring column 16 respectively.

The sampling water is introduced through a pipe 5 and a diffusion rose 6, in the solvent contained in the extraction column 15 so as to form an emulsion in the portion 2 of the solvent contained in such column of extraction without disturbing the portion 3 of solvent contained in the latter. The column 4 is provided with a pipe 7 to carry away by spill over the sampling water after the separation thereof from the solvent. A conduit 17 connects the column 15 to the column 16 in order that the nondisturbed solvent of the portion 3 shall communicate with the solvent filling the column 16, the solvent being circulated between the two columns 15 and 16 by means of a pump 11. The solvent contained in the column 16 is recycled through a conduit 10 to the portion of solvent 2 where the emulsion of water and solvent takes place, such recycling being carried out by means of the pump 11. The measuring operations are carried out by means of a photocolorimeter 12, mounted on a conduit 18 opening, on the one hand, onto one of the passages of the valve 8 enabling also the draining of the apparatus and, on the other hand, into a hydraulic ejector 19, the circulation of the solvent in the photocolorimeter being carried out by such hydraulic ejector 19. An indicator is connected, through an amplifier 21, to the photocolorimeter 12, a sound or light alarm device 20 being also connected to the photocolorimeter in order to set off automatically a signal when the proportion of hydrocarbon in solution in the solvent reaches a preset value.

The latter apparatus works as follows:

the sample of water is introduced in a continuous manner in the column 15 and is diffused in the said portion 2 of solvent wherein the water and solvent emulsion takes place and the separation of solvent and water is carried out, the latter being continuously carried away after separation by the overflow conduit 7. The solvent from portion 3 of the extraction column 15 is drawn by the constant flow pump 11, into the solvent of measuring column 16 with which it mixes so as to transfer to the solvent contained in the column 16 the coloration it may eventually have acquired in the extraction column, the solvent being recycled, through the conduit 10, from the column 16, by means of the pump 11 and the hydraulic ejector 19, to the column 15, such recycling having for its object to continue the dissolving of the hydrocarbon of the sampling water in order to assure the sought cumulative effect, the ejector 19 carrying out the circulation of the solvent in the conduit 18 and through the photocolorimeter 12.

To summarize, the apparatus works according to three quite distinct cycles of circulation, i.e. the circulation, according to the arrows 22, of the sample in the top portion of the extraction column in order to extract the hydrocarbon from the sample, circulation, according to the arrows 23, of the solvent in the bottom portion of the column 15 towards the top portion of the measuring column 16 and from the column 16 to the column 15 for recycling through the conduit 10 whereon is provided a flow indicator 24, such circulation being carried out by means of pump 11 and ejector 19 and, lastly, circulation, according to the arrows 25, of the solvent in the conduit 18 and the photocolorimeter 12, the latter circulation taking place on account of the suction set up by the ejector 19, the solvent being delivered to the conduit 18 through one of the passages of the valve 8.

The said apparatus offers the following advantages: the measuring operations are not affected by the fluctuations of the flow of sampling water, great measuring stability because of constant flow in the measuring column and in the conduit 18, no pollution of the measuring solvent by air or water entering the latter. The said apparatus offers moreover a very high rate of response and the use of carbon tetrachloride enables the analysis of samples of condensates with temperatures up to 60° C to be carried out.

It must be understood that the invention is in no way limited to the described forms of embodiment and that many changes may be introduced therein without departing from the scope of the present patent application.

The said apparatus may be used for the detection, dosage, of the presence of a hydrocarbon in a gas, for example compressed air. In that case, the sample of compressed air is expanded, if need be and introduced so as to bubble in water, the latter being introduced in the apparatus through the diffusion rose 6.

I claim:

1. A method of detecting a hydrocarbon in a carrier liquid which comprises: placing a solvent for the hydrocarbon in an elongated vertical column, diffusing a sample of the carrier liquid into a first portion of said column containing said solvent for the hydrocarbon and said solvent being immissible with said carrier liquid and said solvent having a specific gravity different from that of said carrier liquid in order to form in said one portion of the column an emulsion of said carrier liquid and solvent without disturbing the solvent in another portion of the column, whereupon the emulsion separates by gravity from said carrier liquid and solvent and the hydrocarbon dissolves in the solvent at the interface between the emulsion and the solvent, and optically testing the color of the solvent in a second portion of the column to determine its hydrocarbon content.

2. A method as in claim 1 wherein said step of diffusing a sample of the carrier fluid comprises diffusing water.

3. A method as in claim 2 wherein the step of diffusing a sample of water comprises continuously diffusing into said first portion of said column and further comprising step of continuously removing the water from the column after it has separated from the emulsion.

4. A method as in claim 1 including the step of recycling solvent from said second portion of said column to said first portion of said column.

5. A method as in claim 2 wherein said solvent has a specific gravity greater than water, wherein the step of diffusing comprises diffusing the water into the top portion of the column, and wherein said step of optically testing the solvent comprises optically testing the solvent in the lower portion of said column for its hydrocarbon content.

6. A method as in claim 2 wherein said step of placing the solvent in the column comprises placing carbon tetrachloride in the column and wherein said hydrocarbon is fuel oil.

* * * * *